United States Patent
Huff et al.

(10) Patent No.: US 9,335,079 B2
(45) Date of Patent: May 10, 2016

(54) LOW SUCTION PRESSURE PROTECTION FOR REFRIGERANT VAPOR COMPRESSION SYSTEM

(75) Inventors: Hans-Joachim Huff, Mainz (DE); Suresh Duraisamy, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 438 days.

(21) Appl. No.: 13/500,686

(22) PCT Filed: Nov. 22, 2010

(86) PCT No.: PCT/US2010/057604
§ 371 (c)(1),
(2), (4) Date: Apr. 6, 2012

(87) PCT Pub. No.: WO2011/066214
PCT Pub. Date: Jun. 3, 2011

(65) Prior Publication Data
US 2012/0198868 A1    Aug. 9, 2012

Related U.S. Application Data (60) Provisional application No. 61/264,306, filed on Nov. 25, 2009.

(51) Int. Cl.
*F25B 49/02* (2006.01)
*F25B 1/00* (2006.01)
(Continued)

(52) U.S. Cl.
CPC ............ *F25B 41/043* (2013.01); *F25B 9/008* (2013.01); *F25B 49/02* (2013.01); *F25B 1/10* (2013.01);
(Continued)

(58) Field of Classification Search
CPC .............. F25B 1/10; F25B 9/008; F25B 7/00; F25B 2341/064; F25B 2600/2513; F25B 2600/2515; F25B 41/062; F25B 2309/06; F25B 2309/061
USPC ................... 62/126, 114, 217, 222, 224, 225
See application file for complete search history.

(56) References Cited

U.S. PATENT DOCUMENTS 3,603,806 A    9/1971   Hitzke
5,245,836 A *  9/1993   Lorentzen ............... F25B 9/008
                                                    62/174

(Continued)

FOREIGN PATENT DOCUMENTS

EP    0945290 A2    9/1999
EP    1146299       10/2001
(Continued)

OTHER PUBLICATIONS

International Search Report and Written Opinion mailed Mar. 10, 2011.
(Continued)

*Primary Examiner* — Marc Norman
*Assistant Examiner* — Kirstin Oswald
(74) *Attorney, Agent, or Firm* — Cantor Colburn LLP (57) ABSTRACT

The present disclosure provides a refrigerant vapor compression system includes a compressor (12) having a suction port and a discharge port, a refrigerant heat rejection heat exchanger (24) operatively coupled downstream to the discharge port of the compressor, a refrigerant heat absorption heat exchanger (42) operatively coupled downstream to the refrigerant heat rejection heat exchanger, a compressor suction inlet line connecting the refrigerant heat absorption heat exchanger to the suction port of the compressor, and an adiabatic expansion device (54) operatively coupled to the suction inlet line. A sensor operatively coupled to the suction inlet line measures a superheat value of the refrigerant. The refrigerant vapor compression system further includes a controller (60) in communication with the sensor. The controller is configured to operate the refrigerant vapor compression system in a first mode when a pressure of the refrigerant downstream of the adiabatic expansion device is greater than a threshold value, and operate the refrigerant vapor compression system in a second mode when the pressure of the refrigerant downstream of the adiabatic expansion device is less than the threshold value. The compressor continues to operate in both the first mode and the second mode.

11 Claims, 6 Drawing Sheets

(51) Int. Cl.
  *F25B 41/04* (2006.01)
  *F25B 9/00* (2006.01)
  *F25B 1/10* (2006.01)

(52) U.S. Cl.
  CPC ....... *F25B 2309/06* (2013.01); *F25B 2341/065* (2013.01); *F25B 2341/0662* (2013.01); *F25B 2400/01* (2013.01); *F25B 2400/13* (2013.01); *F25B 2400/23* (2013.01); *F25B 2600/0261* (2013.01); *F25B 2600/0272* (2013.01); *F25B 2600/2509* (2013.01); *F25B 2600/2513* (2013.01); *F25B 2700/151* (2013.01); *F25B 2700/197* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21172* (2013.01); *F25B 2700/21175* (2013.01); *Y02B 30/72* (2013.01)

(56) References Cited

U.S. PATENT DOCUMENTS

| | | | | |
|---|---|---|---|---|
| 5,291,098 | A * | 3/1994 | Okita | H05B 33/26 313/498 |
| 5,458,188 | A * | 10/1995 | Roehrich | B60H 1/3202 165/61 |
| 5,555,744 | A | 9/1996 | Hirano | |
| 5,921,098 | A * | 7/1999 | Schmidt et al. | 62/202 |
| 6,058,729 | A * | 5/2000 | Lifson | F25B 41/04 236/1 EA |
| 6,085,533 | A * | 7/2000 | Kaido et al. | 62/196.2 |
| 6,105,386 | A | 8/2000 | Kuroda et al. | |
| 6,298,673 | B1 | 10/2001 | Fung et al. | |
| 6,385,980 | B1 * | 5/2002 | Sienel | F25B 5/04 62/174 |
| 6,883,341 | B1 * | 4/2005 | Lifson | F04C 28/24 418/60 |
| 6,964,173 | B2 | 11/2005 | Dobmeier et al. | |
| 7,290,402 | B1 * | 11/2007 | Bailey | F25B 41/062 236/92 B |
| 7,458,223 | B2 | 12/2008 | Pham | |
| 2002/0116938 | A1 | 8/2002 | Uno et al. | |
| 2004/0244394 | A1 * | 12/2004 | Nakayama | F25B 9/008 62/190 |
| 2004/0250568 | A1 * | 12/2004 | Sienel | F25B 9/008 62/513 |
| 2006/0213223 | A1 | 9/2006 | Wilding et al. | |
| 2007/0193290 | A1 * | 8/2007 | Ebara | B60H 1/00885 62/238.6 |
| 2008/0245505 | A1 * | 10/2008 | Yamaguchi | F25B 1/10 165/63 |
| 2008/0256975 | A1 * | 10/2008 | Lifson | F25B 1/10 62/510 |
| 2009/0071175 | A1 | 3/2009 | Pham | |
| 2009/0107156 | A1 | 4/2009 | Kishibe et al. | |
| 2009/0241566 | A1 * | 10/2009 | Bush | F25B 9/008 62/115 |

FOREIGN PATENT DOCUMENTS

| | | |
|---|---|---|
| WO | 2006097106 | 9/2006 |
| WO | 2008064816 A1 | 6/2008 |
| WO | 2008112572 | 9/2008 |
| WO | 2009091401 | 7/2009 |

OTHER PUBLICATIONS

International Preliminary Report on Patentability mailed Jun. 7, 2012.

* cited by examiner

LOW SUCTION PRESSURE PROTECTION FOR REFRIGERANT VAPOR COMPRESSION SYSTEM

CROSS-REFERENCE TO RELATED APPLICATION

Reference is made to and this application claims priority from and the benefit of U.S. Provisional Application Ser. No. 61/264,306, filed Nov. 25, 2009, and entitled LOW SUCTION PRESSURE PROTECTION FOR REFRIGERANT VAPOR COMPRESSION SYSTEM, which application is incorporated herein in its entirety by reference.

FIELD OF THE INVENTION

This disclosure relates generally to refrigeration systems and, more specifically, to a method and apparatus for controlling a refrigerant vapor compression system.

BACKGROUND OF THE INVENTION

Conventional vapor compression systems typically include a compressor, a heat rejection heat exchanger, a heat absorption heat exchanger, and an expansion device disposed upstream of the heat absorption heat exchanger. Some systems further include a second expansion device downstream of the heat rejection heat exchanger, such as a suction modulation valve. These basic system components are interconnected by working fluid lines in a closed circuit.

Depending upon the characteristics of the working fluid in use in a particular application, a vapor compression system may be operated in either a subcritical mode or a transcritical mode. In vapor compression systems operating in a subcritical cycle, both the vapor heat rejection heat exchanger and the heat absorption heat exchanger operate at pressures below the critical pressure of the working fluid. Thus, in the subcritical mode, the vapor heat rejection heat exchanger functions as a working fluid condenser and the heat absorption heat exchanger functions as a working fluid evaporator.

However, in refrigerant vapor compression systems operating in a transcritical cycle, the vapor heat rejection heat exchanger operates at a refrigerant temperature and pressure in excess of the refrigerant's critical pressure, while the heat absorption heat exchanger operates at a refrigerant temperature and pressure in the subcritical range. Thus, in the transcritical mode, the vapor heat rejection heat exchanger functions as a working fluid gas cooler and the heat absorption heat exchanger functions an as a working fluid evaporator.

In vapor compression systems used in refrigeration applications, commonly referred to as refrigerant vapor compression systems, the working fluid is refrigerant. Refrigerant vapor compression systems charged with conventional refrigerants, such as for example, fluorocarbon refrigerants such as, but not limited to, hydrochlorofluorocarbons (HCFCs), such as R22, and more commonly hydrofluorocarbons (HFCs), such as R134a, R404A, and R407C, typically operate in the subcritical mode. "Natural" refrigerants, such as carbon dioxide, are also used in refrigerant vapor compression systems instead of HCFC or HFC refrigerants. Because carbon dioxide has a low critical temperature, most refrigerant vapor compression systems charged with carbon dioxide as the refrigerant are designed for operation in the transcritical mode.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, i.e. an idle state.

In more complex refrigeration vapor compression systems, such as those equipped with a multi-stage compression device and capacity modulation, it is customary to provide a number of refrigerant flow control devices to permit selective control of refrigerant flow through the various branches of the refrigerant circuit. The refrigerant flow through the flow control devices generally follows an adiabatic expansion; that is, no heat is added or taken away from the flow. In many flow control devices the adiabatic expansion also follows a line of constant enthalpy. If the refrigerant is operating in a transcritical cycle, in some operating regimes the refrigerant pressure can drop close to or below the triple point pressure. Solid-phase refrigerant may form, for which the refrigerant system was not designed. The solid phase refrigerant may damage components or cause inefficiencies, which is undesirable.

SUMMARY OF THE INVENTION

The present disclosure provides a refrigerant vapor compression system includes a compressor having a suction port and a discharge port, a refrigerant heat rejection heat exchanger operatively coupled downstream to the discharge port of the compressor, a refrigerant heat absorption heat exchanger operatively coupled downstream to the refrigerant heat rejection heat exchanger, a compressor suction inlet line connecting the refrigerant heat absorption heat exchanger to the suction port of the compressor, and an adiabatic expansion device operatively coupled to the suction inlet line. A sensor operatively coupled to the suction inlet line measures a superheat value of the refrigerant. The refrigerant vapor compression system further includes a controller in communication with the sensor. The controller is configured to operate the refrigerant vapor compression system in a first mode when a pressure of the refrigerant downstream of the adiabatic expansion device is greater than a threshold value, and operate the refrigerant vapor compression system in a second mode when the pressure of the refrigerant downstream of the adiabatic expansion device is less than the threshold value. The compressor continues to operate in both the first mode and the second mode.

In one aspect of the disclosure, the second mode includes increasing the superheat value of the refrigerant in the suction inlet line.

In one aspect of the disclosure, the system further includes an expansion valve upstream of the refrigerant heat absorption heat exchanger, and increasing the superheat value includes adjusting the expansion valve.

In one aspect of the disclosure, operating the refrigerant vapor compression system in a second mode further comprises operating with a pressure at the suction port of the compressor being less than the triple point pressure of the refrigerant.

In one aspect of the disclosure, the system further includes a heater disposed in thermal contact with the suction inlet line, and increasing the superheat value of the refrigerant includes powering the heater.

In another aspect of the disclosure, the second mode includes reducing a pressure upstream of the adiabatic expansion device until a pressure downstream of the adiabatic expansion device is above the triple point pressure of the refrigerant.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF THE INVENTION

Figure 1:
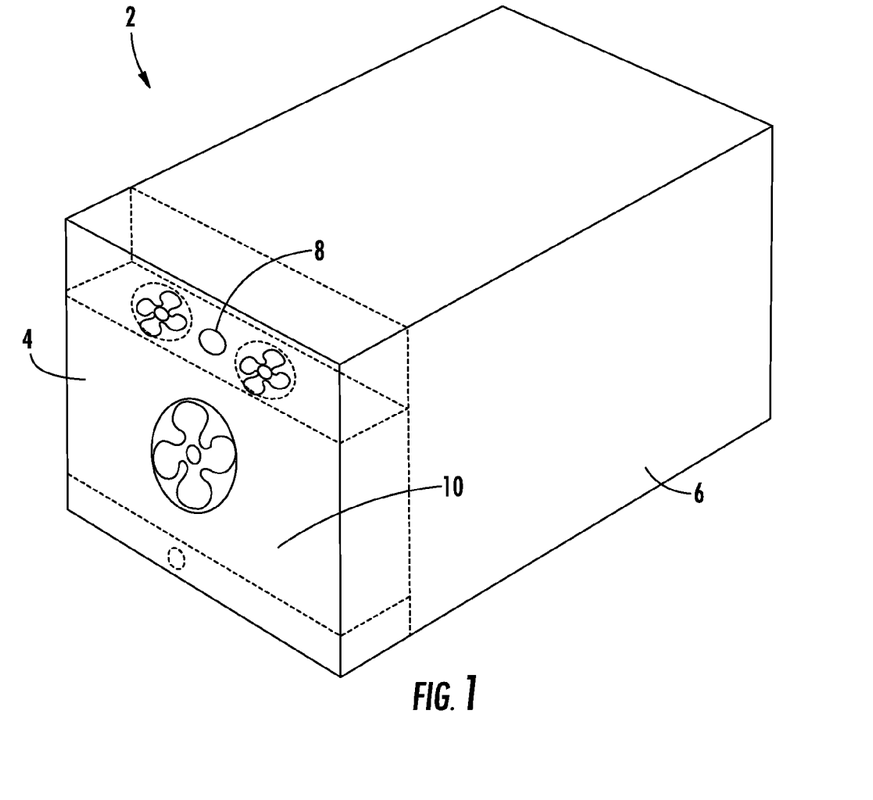
FIG. 1 schematically illustrates an embodiment of a refrigerant vapor compression system according to the application.

Referring to FIG. 1, a refrigerant vapor compression system 2 may include a transport refrigeration unit 4 coupled to an enclosed space within a container 6. The container 6 may be a temperature controlled environment, such as a cargo box of a refrigerated transport truck, trailer or container, or a display case, merchandiser, freezer cabinet, cold room or other perishable/frozen product storage area in a commercial establishment, or a climate controlled comfort zone within a residence, office building, hospital, school, restaurant or other facility. In the disclosed example, the refrigerant vapor compression system 2 is of the type utilized on refrigerated transport truck. As shown in FIG. 1, the transport refrigeration unit 4 is configured to maintain a programmed thermal environment within the container 6.

In FIG. 1, the transport refrigeration unit 4 is mounted at one end of the container 6. However, the transport refrigeration unit 4 may also be mounted to one or more sides of the container 6. In one embodiment, a plurality of transport refrigeration units 4 may be mounted to a single container 6. Alternatively, a single transport refrigeration unit 4 may be mounted to a plurality of containers 6 or multiple enclosed spaces within a single container. The transport refrigeration unit 4 typically operates to intake air at a first temperature and to exhaust air at a second temperature. In one embodiment, the exhaust air from the transport refrigeration unit 4 will be warmer than the intake air such that the transport refrigeration unit 4 is utilized to warm the air in the container 6. In another embodiment, the exhaust air from the transport refrigeration unit 4 will be cooler than the intake air such that the transport refrigeration unit 4 is utilized to cool the air in the container 6.

In one embodiment, the transport refrigeration unit 4 may include one or more temperature sensors to continuously or repeatedly monitor the return air temperature and/or the supply air temperature. As shown in FIG. 1, a supply air temperature sensor (STS) 8 of the transport refrigeration unit 4 may provide the supply temperature and a return air temperature sensor (RTS) 10 of the transport refrigeration unit 4 may provide the return temperature to the transport refrigeration unit 4, respectively. Alternatively, the supply temperature and the return temperature may be determined using remote sensors.

A refrigerant vapor compression system 2 may provide air with controlled temperature, humidity or/and species concentration into an enclosed chamber where cargo is stored such as in container 6. The refrigerant vapor compression system 2 is capable of controlling a plurality of the environmental parameters or all the environmental parameters within corresponding ranges with a great deal of variety of cargoes and under all types of ambient conditions.

Figure 2:
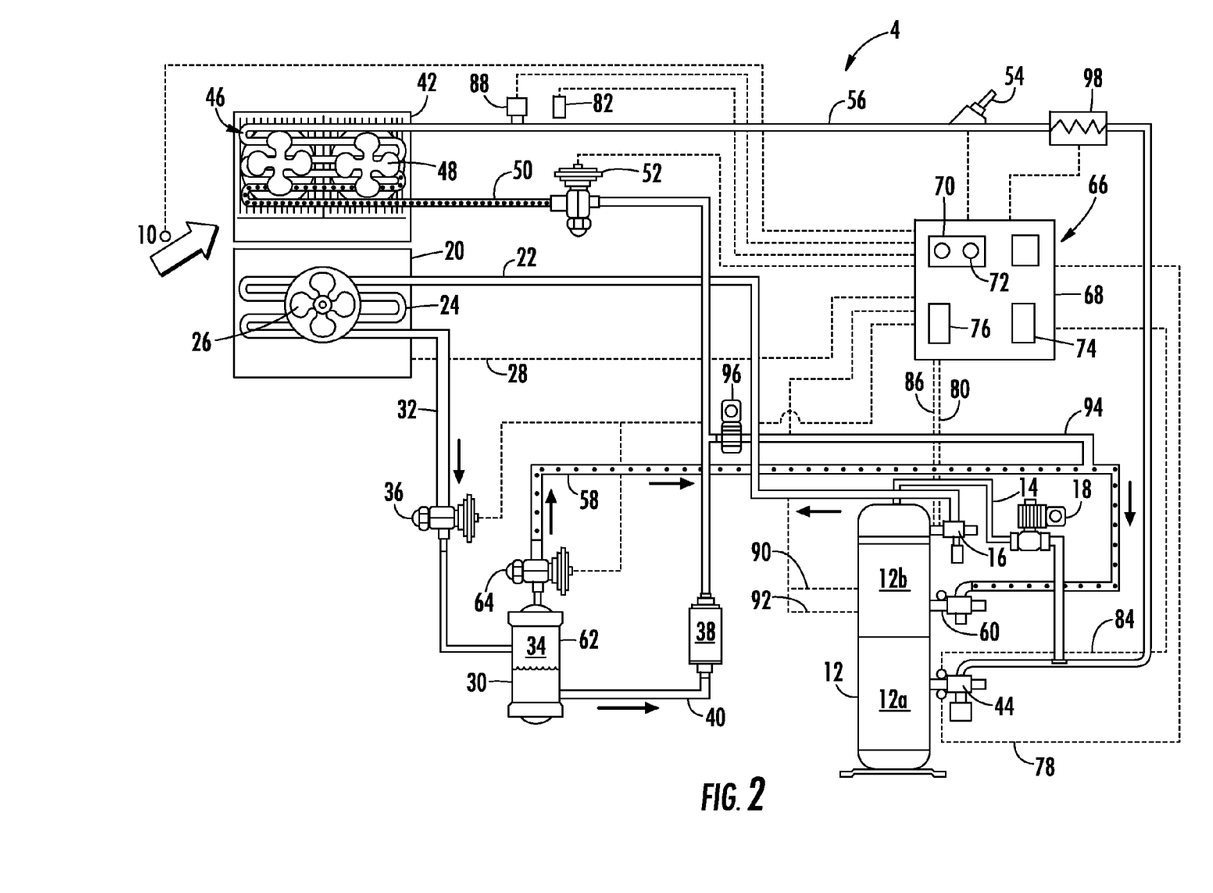
FIG. 2 schematically illustrates an exemplary embodiment of the transport refrigeration unit of FIG. 1.

Referring to FIG. 2 of the drawings, an exemplary embodiment of a refrigerant vapor compression system 2 designed for operation in a transcritical cycle with a low critical point refrigerant is shown. The low critical point refrigerant may be carbon dioxide and refrigerant mixtures containing carbon dioxide, for example. However, it is to be understood that the refrigerant vapor compression system 2 may also be operated in a subcritical cycle with a higher critical point refrigerant such as conventional hydrochlorofluorocarbon and hydrofluorocarbon refrigerants.

The refrigerant vapor compression system 2 is particularly suitable for use in a transport refrigeration system for refrigerating the air or other gaseous atmosphere within the temperature controlled enclosed volume such as a cargo space of a truck, trailer, container, or the like for transporting perishable/frozen goods. The refrigerant vapor compression system 2 is also suitable for use in conditioning air to be supplied to a climate controlled comfort zone within a residence, office building, hospital, school, restaurant or other facility. The refrigerant vapor compression system 2 could also be employed in refrigerating air supplied to display cases, merchandisers, freezer cabinets, cold rooms or other perishable/frozen product storage areas in commercial establishments.

The refrigerant vapor compression system 2 includes a multi-stage compressor 12, wherein the refrigerant is compressed to a higher temperature and pressure. The compressor 12 may be powered by single phase electric power, three phase electrical power, and/or a diesel engine and can, for example, operate at a constant speed. The compressor 12 may be a scroll compressor, a rotary compressor, a reciprocal compressor, or the like. The transport refrigeration unit 4 requires electrical power from, and can be connected to, a power supply unit (not shown) such as a standard commercial power service, an external power generation system such as that found shipboard, a diesel generator, or the like.

In the illustrated embodiment, the compressor 12 is a single multiple stage refrigerant compressor, for example a screw compressor or a reciprocating compressor disposed in the primary refrigerant circuit and having a first compression stage 12a and a second compression stage 12b. The first and second compression stages are disposed in series refrigerant flow relationship, with the refrigerant leaving the first compression stage 12a passing directly to the second compression stage 12b for further compression. Alternatively, the compressor 12 may comprise a pair of independent compressors 12a and 12b, connected in series refrigerant flow relationship in the primary refrigerant circuit via a refrigerant line connecting the discharge outlet port of the first compressor 12a in refrigerant flow communication with an inlet port (e.g. the suction inlet port) of the second compressor 12b. In the independent compressor embodiment, the compressors 12a and 12b may be scroll compressors, screw compressors, reciprocating compressors, rotary compressors or any other type of compressor or a combination of any such compressors. In the embodiment depicted in FIG. 2, the refrigerant vapor compression system 2 includes a bypass line 14 providing a refrigerant flow passage from a discharge port 16 of the compressor 12 back to the suction side of the compressor. An unload valve 18 disposed in the bypass line 14 may be selectively positioned in an open position in which refrigerant flow passes through the bypass line 14 and a closed position in which refrigerant flow through the bypass line 14 is partially restricted or shut off.

The refrigerant vapor compression system 2 further includes a refrigerant heat rejection heat exchanger 20 operatively coupled to the discharge port 16 of the compressor 12 along a compressor discharge line 22. In a refrigerant vapor compression system operating in a transcritical cycle, such as systems utilizing carbon dioxide refrigerants, for example, the refrigerant heat rejection heat exchanger 20 is commonly referred to as a gas cooler. The supercritical refrigerant (gas) passes in heat exchange relationship with a cooling medium such as ambient gas or liquid (e.g., air or water), for example. In a refrigerant vapor compression system operating in a subcritical cycle, such as systems utilizing fluorocarbon refrigerants for example, the refrigerant heat rejection heat exchanger 20 is commonly referred to as a condenser. The condenser may include a refrigerant condensing heat exchanger through which hot, high pressure refrigerant vapor passes in heat exchange relationship with the cooling medium and is condensed to a liquid.

The refrigerant heat rejection heat exchanger 20 may comprise a finned-tube heat exchanger, such as a fin and round tube heat exchange coil or a fin and mini-channel flat tube heat exchanger, for example. Refrigerant passes through serpentine tubes 24 in heat exchange relationship with ambient air being drawn through the heat exchanger 20 by one or more fans 26. The air stream from the fan 26 allows heat to be removed from the refrigerant circulating within the refrigerant heat rejection heat exchanger 20. An ambient air temperature sensor (AAT) 28 may be positioned upstream of the fan 26 to sense the ambient air temperature.

The refrigerant vapor compression system 2 may include a receiver 30 operatively disposed downstream of the refrigerant heat rejection heat exchanger 20 along a condenser discharge line 32 to provide storage for excess liquid refrigerant during low temperature operation. In one example, the receiver 30 is a flash tank receiver having a separation chamber 34 wherein refrigerant in the liquid state collects in a lower portion of the separation chamber and refrigerant in the vapor state collects in the portion of the separation chamber above the liquid refrigerant. In the example, the refrigerant is carbon dioxide ($CO_2$). As the $CO_2$ refrigerant leaves the refrigerant heat rejection heat exchanger 20, it passes through an auxiliary expansion valve 36. The auxiliary expansion valve 36 may be a variable control valve selectively positionable so as to expand the refrigerant to a lower pressure so it enters the flash tank receiver 30 as a mixture of liquid refrigerant and vapor. The flash tank receiver 30 operates as a charge control tank. The liquid refrigerant settles in the lower portion of the flash tank receiver 30 and the refrigerant vapor collects in the upper portion. A filter drier 38 may be disposed downstream of the receiver 30 along a refrigerant liquid line 40 to keep the refrigerant clean and dry.

In another embodiment, the receiver 30 may include a water-cooled condenser and associated plumbing (not shown).

Whether the refrigerant vapor compression system 2 is operating in a transcritical cycle or a subcritical cycle, the system further includes a refrigerant heat absorption heat exchanger 42, also referred to herein as an evaporator, operatively coupled between the refrigerant heat rejection heat exchanger 20 and a suction port 44 of the compressor 12. In the evaporator 42, refrigerant liquid or a mixture of refrigerant liquid and vapor is passed in heat exchange relationship with a fluid to be cooled, most commonly air, drawn from and returned to the container 6. In one example, the refrigerant heat absorption heat exchanger 42 comprises a finned tube heat exchanger 46 through which refrigerant passes in heat exchange relationship with air drawn from and returned to the refrigerated container 6 by one or more evaporator fans 48. The finned tube heat exchanger 46 may comprise, for example, a fin and round tube heat exchange coil or a fin and mini-channel flat tube heat exchanger. The evaporator fan 48 may be located and ducted so as to circulate the air contained within the container 6. In one embodiment, the evaporator fan 48 directs the stream of air across the surface of the finned tube heat exchanger 46, thereby removing heat from the air, and the reduced temperature air is then circulated within the enclosed volume of the container 6 to lower the temperature of the enclosed volume.

An adiabatic expansion device may be connected along an evaporator inlet line 50 between an output of the refrigerant heat rejection heat exchanger 20 and an input of the refrigerant heat absorption heat exchanger 42. In the disclosed embodiment, the adiabatic expansion device is an electronic expansion valve 52 to meter the refrigerant flow so as to maintain a desired level of superheat in the refrigerant vapor leaving the evaporator 42. The expansion valve 52 helps ensure that no liquid is present in the refrigerant leaving the evaporator 42. The low pressure refrigerant vapor leaving the evaporator 42 returns to the suction port 44 of the first compression stage or first compressor 12a.

In one embodiment, the refrigerant vapor compression system 2 further includes a second or alternate adiabatic expansion device for capacity modulation, namely a suction modulation valve 54. In the illustrated example, the suction modulation valve 54 is positioned along a suction inlet line 56 between the outlet of the refrigerant heat absorption heat exchanger 42 and the tee for the compressor unload bypass line 14. The suction modulation valve 54 may comprise a pulse width modulated solenoid valve in one example.

Additionally, the refrigerant vapor compression system 2 may include an economizer circuit establishing refrigerant vapor flow along an injection line 58 between the receiver 30 and an intermediate inlet port 60 of the compressor 12. The economizer circuit includes an economizer device 62 and an economizer expansion valve 64 to expand the refrigerant to a lower pressure, sufficient to establish a mixture of refrigerant in a vapor state and refrigerant in a liquid state. In the illustrated embodiment, the economizer device 62 is the flash tank receiver 30, and the economizer expansion valve 64 is disposed in operative association with and downstream of the economizer device 62. The economizer expansion valve 64 may be a high pressure electronic expansion valve, for example. The vapor injection line 58 connects the upper portion of the separation chamber 34 of the flash tank receiver 30 to the intermediate inlet port 60 of the compressor 12.

The refrigerant vapor compression system 2 also includes a control system operatively associated therewith for controlling operation of the refrigerant vapor compression system. The control system can include a controller 66 that can determine the desired mode of operation in which to operate the refrigerant vapor compression system 2 based upon consideration of refrigeration load requirements, ambient conditions and various sensed system operating parameters. In the disclosed embodiment, the controller 66 includes a microprocessor board 68 that contains a microprocessor 70 and its associated memory 72, an input/output (I/O) board 74, which includes an analog to digital converter 76 which receives temperature inputs and pressure inputs from various points in the system, AC current inputs, DC current inputs, voltage inputs and humidity level inputs. The memory 72 of the controller 66 can contain operator or owner preselected, desired values for various operating parameters within the system 2 including, but not limited to, temperature set points for various locations within the system 2 or the container 6, pressure limits, current limits, engine speed limits, and any variety of other desired operating parameters or limits with the system 2. In addition, input/output board 74 includes drive circuits or field effect transistors ("FETs") and relays which receive signals or current from the controller 66 and in turn control various external or peripheral devices in the system 2, such as the expansion valve 52, for example.

Among the specific sensors and transducers monitored by the controller 66 are the return air temperature sensor (RTS) 10 which inputs into the microprocessor 70 a variable resistor value according to the evaporator return air temperature; the ambient air temperature (AAT) sensor 28 which inputs into the microprocessor 70 a variable resistor value according to the ambient air temperature read in front of the refrigerant heat rejection heat exchanger 20; a compressor suction temperature (CST) sensor 78; which inputs to the microprocessor 70 a variable resistor value according to the compressor suction temperature; a compressor discharge temperature (CDT) sensor 80, which inputs to the microprocessor 70 a resistor value according to the compressor discharge temperature inside the dome of the compressor 12; an evaporator outlet temperature (EVOT) sensor 82, which inputs to the microprocessor 70 a variable resistor value according to the outlet temperature of the refrigerant heat absorption heat exchanger 42; the compressor suction pressure (CSP) transducer 84, which inputs to the microprocessor 70 a variable voltage according to the compressor suction value of the compressor 12; the compressor discharge pressure (CDP) transducer 86, which inputs to the microprocessor 70 a variable voltage according to the compressor discharge value of the compressor 12; the evaporator outlet pressure (EVOP) transducer 88 which inputs to the microprocessor 70 a variable voltage according to the outlet pressure of the refrigerant heat absorption heat exchanger 42; a direct current sensor 90 and alternating current sensor 92 (CT1 and CT2, respectively), which input to the microprocessor 70 a variable voltage values corresponding to the current drawn by the system 2.

The controller 66 processes the data received from the various sensors and controls operation of the compressor 12, operation of the fan(s) 26 associated with the refrigerant heat rejection heat exchanger 20, operation of the evaporator fan(s) 48, operation of the expansion valve 52, and operation of the suction modulation valve 54. In the FIG. 2 embodiment, the controller 66 may also control the positioning of the unload valve 18 to selectively open the unload valve to bypass refrigerant from an intermediate pressure stage of the compressor 12 through the bypass line 14 back to the suction side of the compressor 12 when it is desired to unload the first stage of the compressor.

In the embodiment depicted in FIG. 2, the refrigerant vapor compression system 2 may further include a refrigerant liquid injection line 92. The refrigerant liquid injection line 92 can tap into the refrigerant liquid line 40 at a location downstream of the receiver 30 and upstream of the expansion valve 52 and open into the intermediate inlet port 60 of the compressor 12. A liquid injection flow control device 94 may be disposed in the liquid injection line 92. The liquid injection flow control device 94 may comprise a flow control valve selectively positionable between an open position wherein refrigerant liquid flow may pass through the liquid injection line 92 and a closed position wherein refrigerant liquid flow through the refrigerant liquid injection line 92 is reduced or blocked. In an embodiment, the liquid injection flow control device 94 comprises a two-position solenoid valve of the type selectively positionable between a first open position and a second closed position.

In the exemplary embodiment of the refrigerant vapor compression system 2 depicted in FIG. 2, injection of refrigerant vapor or refrigeration liquid into the intermediate inlet port 60 of the compressor 12 would be accomplished by injection of the refrigerant vapor or refrigerant liquid into the refrigerant passing from the first compression stage 12a into the second compression stage 12b of the compressor 12.

The controller 66 may also control the positioning of the auxiliary expansion valve 36, the economizer expansion valve 64, and/or the liquid injection flow control device 94. The controller 66 may position the auxiliary expansion valve 36 responsive to temperature and pressure measurements at the exit of the refrigerant heat rejection heat exchanger 20. The controller 66 may also control the positioning of the economizer expansion valve 64 to selectively permit refrigerant vapor to pass from the economizer device 62 through the injection line 58 for admittance into the intermediate inlet port 60 of the compressor 12. Similarly, the controller 66 may also position the liquid injection flow control device 94 in an open position for selectively permitting refrigerant liquid to pass from the receiver 30 through the liquid injection line 92 for injection into the intermediate inlet port 60 of the compressor 12.

One problem encountered in a transcritical refrigerant vapor compression system 2 is that, under some operating conditions, the refrigerant vapor may enter a solid-vapor phase wherein gaseous and solid phases of the refrigerant coexist in thermodynamic equilibrium, or a triple point phase wherein the gaseous, liquid, and solid phases of the refrigerant coexist in thermodynamic equilibrium. In either scenario, refrigerant in the solid phase can be destructive to rotating components in the compressor, and may also decrease system performance by obstructing flow passages within valves and the like.

Figure 3:
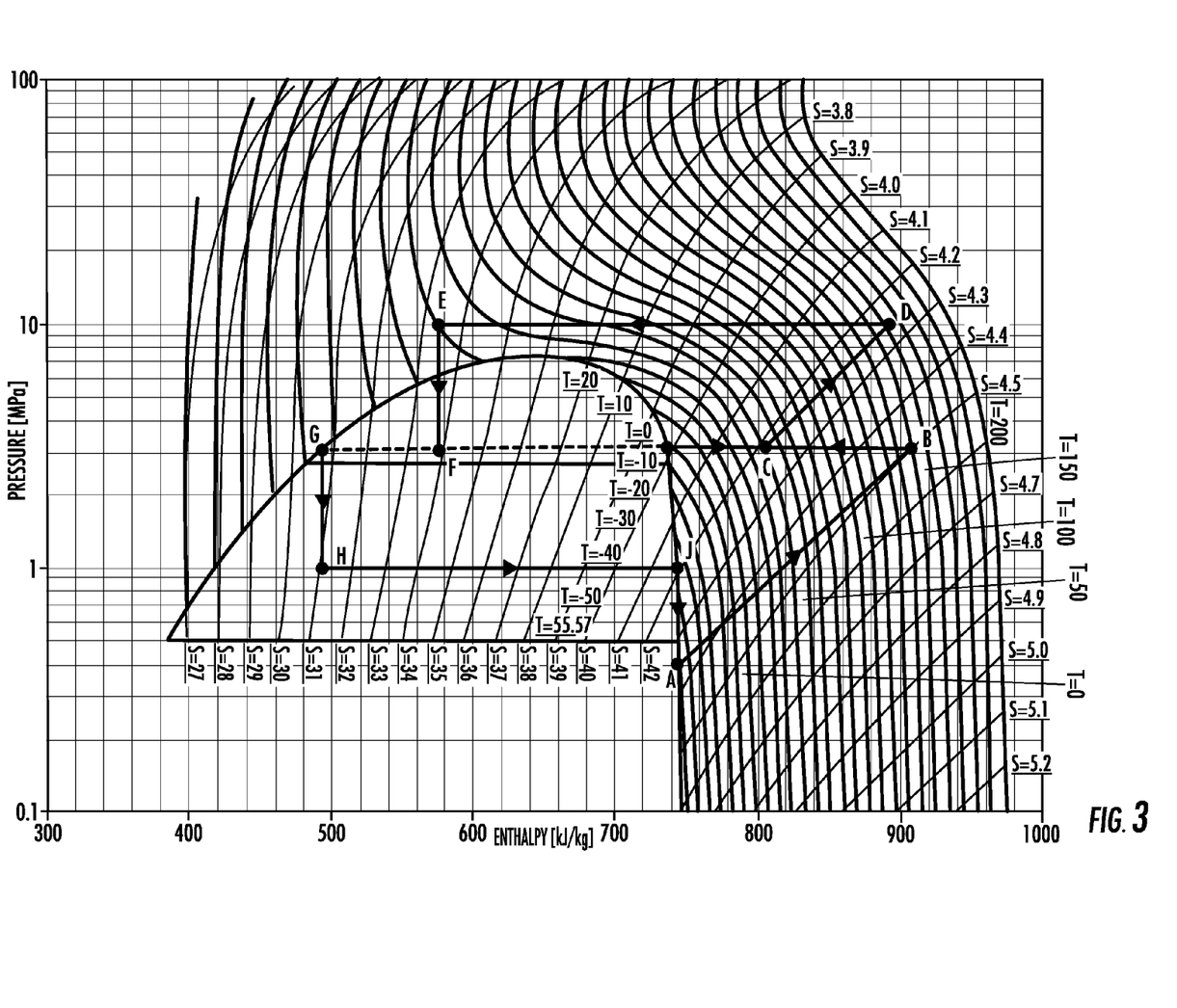
FIG. 3 graphically illustrates a pressure-enthalpy diagram showing an exemplary thermodynamic refrigerant cycle of the refrigerant vapor compression system of FIG. 1.

Referring to FIGS. 2 and 3, an exemplary refrigeration cycle of one embodiment of the refrigerant vapor compression system 2 is illustrated with reference to a carbon dioxide Pressure-Enthalpy diagram. At a point A, the refrigerant enters the compressor 12 at the suction port 44 and is pumped to a higher temperature and pressure, exiting the first stage of the compressor 12 at a point B. Refrigerant vapor from the vapor injection line 58 is mixed with the refrigerant exiting the first stage of the compressor 12, shown at a point C. The refrigerant is pumped to a higher temperature and pressure at the second stage of the compressor 12 and exits the compressor at the discharge port 16, shown at a point D. From point D to a point E, the refrigerant passes through the refrigerant heat rejection heat exchanger 20 and gives up heat at a constant pressure.

From point E to a point F, the refrigerant undergoes adiabatic expansion through the auxiliary expansion valve 36, expanding the refrigerant to a lower pressure so it enters the flash tank receiver 30 as a mixture of liquid refrigerant and vapor, shown at point F. The refrigerant vapor in the flash tank receiver 30 is adiabatically expanded across the economizer expansion valve 64, shown from point F to point C, where it is admitted through the intermediate inlet port 60 and mixed with the refrigerant entering the second stage of the compressor 12. The liquid refrigerant in the flash tank receiver 30, shown at a point G, is adiabatically expanded across the expansion valve 52 to a point H. From point H to a point J, the refrigerant passes through the refrigerant heat absorption heat exchanger 42 and absorbs heat at constant pressure. From point J to point A the refrigerant passes through another adiabatic expansion device, such as the suction modulation valve 54, thereby dropping in pressure at essentially constant enthalpy, and the thermodynamic cycle repeats.

As can be appreciated with reference to FIG. 3, the lowest pressure in the disclosed refrigerant vapor compression system 2 typically occurs at the suction port 44 of the compressor 12, which is downstream of the suction modulation valve 54. If the refrigerant pressure is near the triple point pressure (e.g., 0.52 MPa for $CO_2$) upstream of the suction modulation valve 54 (e.g., along line H-J), the adiabatic expansion across the valve results in a constant-enthalpy pressure drop. Under some conditions, the pressure drop results in formation of the solid phase of the refrigerant.

Figure 4:
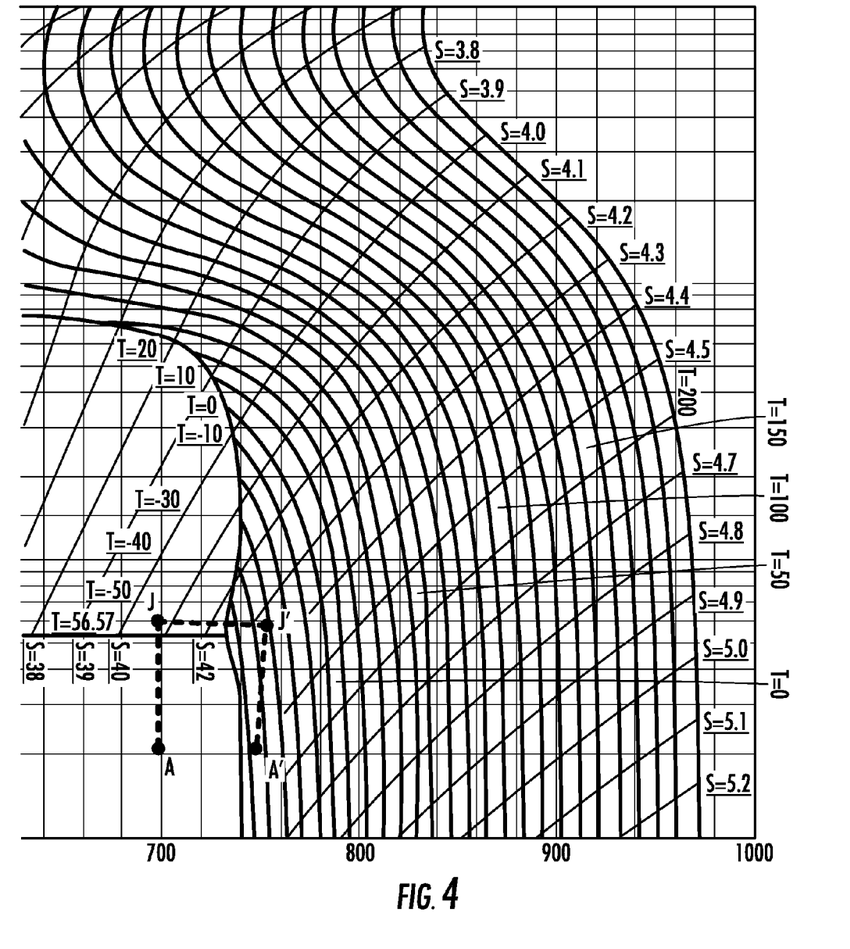
FIGS. 4 and 5 depict an enlarged portion of the exemplary thermodynamic refrigerant cycle of FIG. 3.

Referring now to FIG. 4 of the drawings, one such condition is illustrated in greater detail. At point J, the refrigerant exiting the refrigerant heat absorption heat exchanger 42 is just above the triple point pressure of 0.52 MPa, and at a temperature sufficient to occupy the liquid-vapor phase. As the refrigerant passes through the suction modulation valve 54, the pressure drops to a point A and the refrigerant then occupies the solid-vapor phase. At this point, solid-phase refrigerant may build up on components of the valve 54, blocking the flow and further reducing the pressure. The solid-phase refrigerant may also build up on the suction valve of the compressor 12, causing the compressor to run inefficiently or permanently damage the suction valve. The solid-phase refrigerant may also damage the compressor cylinder during the initial period of the compression stroke.

Figure 5:
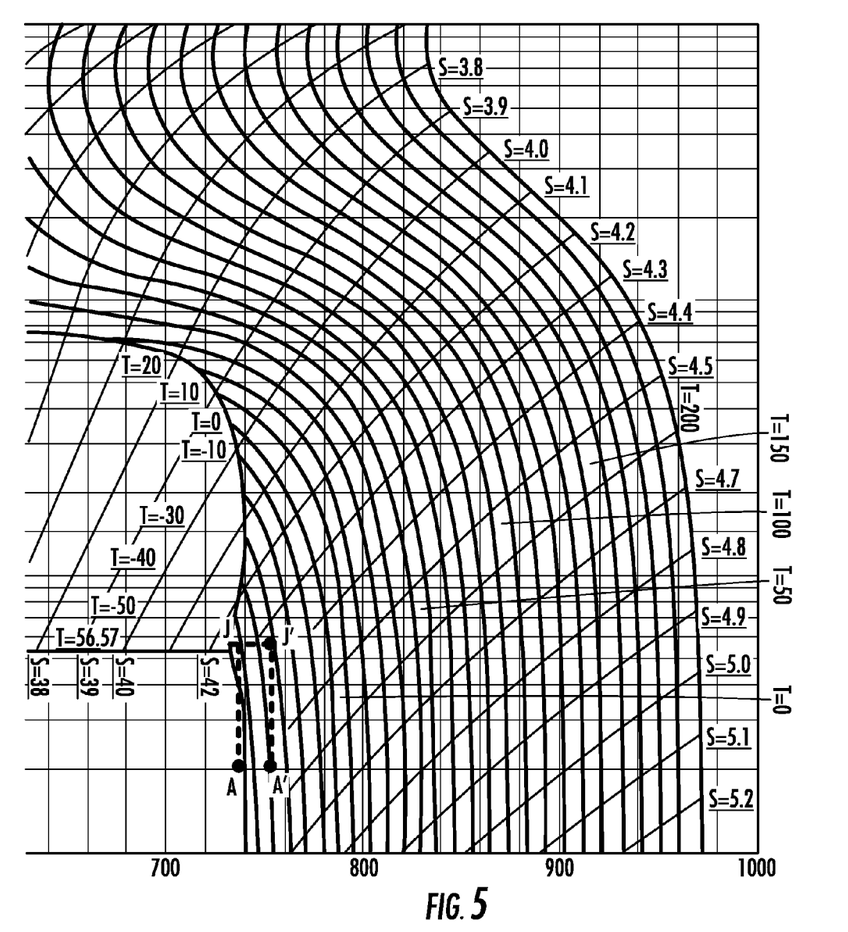

Referring to FIG. 5 of the drawings, under one exemplary operating condition the refrigerant exiting the refrigerant heat absorption heat exchanger 42 is completely in the vapor phase, as illustrated at point J, but just above the triple point pressure of 0.52 MPa. As the refrigerant passes through the suction modulation valve 54 the pressure drops and the refrigerant occupies the solid-vapor phase, illustrated at point A. Thus, even though the refrigerant exiting the refrigerant heat absorption heat exchanger 42 is in the vapor phase and therefore would appear to be warm enough to prevent solid-phase formation, a close inspection of the phase diagram reveals there exists a small window in which solid-phase refrigerant may still form.

To prevent or mitigate the presence of solid phase refrigerant, the controller 66 may be utilized together with temperature and/or pressure sensors to operate the refrigerant vapor compression system 2 in a second mode that prevents the formation of solid-phase refrigerant without having to shut down the compressor 12. If the pressure in the suction inlet line 56 or the compressor suction port 44 approaches the triple point pressure of the refrigerant, the superheat value of the refrigerant may be increased. As used herein, the superheat value of the refrigerant is defined as the difference between the measured vapor temperature and the saturation temperature at the same pressure. The superheat value required to prevent solid-phase formation has been found to be quite small, on the order of 1° K. Consequently, a superheat value of more than 1° K is deemed sufficient to prevent the solid-phase formation of the refrigerant. A superheat value in the range of 1° K to 5° K is deemed sufficient to prevent the solid-phase formation while taking into consideration the measurement accuracy of the system sensors.

Referring to FIG. 4, the controller 66 may determine the pressure of the refrigerant at the point J is sufficiently close to a threshold value that expansion across the suction modulation valve 54 would result in the formation of solid-phase refrigerant, shown at the point A. In one example, the threshold value may be approximately the triple point pressure of the refrigerant. The controller 66 may take steps to increase the superheat value of the refrigerant, such that the refrigerant moves to a point J' on the pressure-enthalpy diagram. In this manner, refrigerant expanding across the suction modulation valve 54 will remain in the vapor phase, as shown at a point A'. Significantly, the pressure downstream of the suction modulation valve 54, or at the suction inlet line 56 of the compressor 12, may be below the triple point pressure of the refrigerant.

In one embodiment, operating the refrigerant vapor compression system 2 in a second mode includes increasing the superheat value of the refrigerant upstream of the suction modulation valve 54. The microprocessor 70 receives inputs from the evaporator outlet pressure transducer 88 and/or the evaporator outlet temperature sensor 82 in order to determine the current thermodynamic state of the refrigerant on a phase diagram or pressure-enthalpy diagram, e.g., whether the refrigerant is in a vapor state, liquid-vapor state, or solid-vapor state. The evaporator outlet pressure and temperature sensors 88, 82 may further be utilized to determine the saturation temperature and the superheat value (if any) upstream of the suction modulation valve 54. This information may in turn be utilized to determine if the pressure of the refrigerant upstream of the suction modulation valve 54 is below a threshold value, such as a fixed value above the triple point pressure. If so, the superheat value of the refrigerant may be increased. For example, the expansion valve 52 in front of the refrigerant heat rejection heat exchanger 20 may be closed down, resulting in less refrigerant flow through the heat exchanger 20. The decrease in flow results in the refrigerant moving to point J' in FIG. 4, for example.

Refrigerant conditions downstream of the suction modulation valve 54 or at the suction port 44 of the compressor 12 may also be included in the control loop logic. For example, operating the refrigerant vapor compression system 2 in a second mode may further include programming the microprocessor 70 to receive inputs from the compressor suction temperature sensor 78 and/or the compressor suction pressure transducer 84 to determine the thermodynamic state of the refrigerant, and increasing the superheat value in the refrigerant upstream of the suction modulation valve 54 in response to the sensors 78, 84.

The controller 66 may determine if a future operation or future set point of the refrigerant vapor compression system 2 will result in the refrigerant entering the solid-vapor phase. If so, the controller 66 may take steps to increase the superheat value of the refrigerant. For example, the capacity demand of the refrigerant vapor compression system 2 may be controlled by the position of the suction modulation valve 54. The valve position (e.g., percent open) may be correlated to a pressure drop value according to the particular characteristics of the valve and the present refrigerant flow conditions. The correlation between the valve position and pressure drop values may be stored in a lookup table in the memory 72 of the controller 66, for example. When the capacity demand of the refrigerant vapor compression system 2 dictates a change in the position of the suction modulation valve 54, the controller 66 may first determine the valve position required to achieve the new set point, then access the lookup table to determine the pressure drop across the valve 54, then determine the resulting pressure of the refrigerant downstream of the suction modulation valve 54, for example at point A in FIG. 4. If the downstream pressure will result in a solid-phase refrigerant, the controller 66 may be programmed to operate in the second mode that will prevent formation of the solid-phase refrigerant without having to shut down the compressor 12.

The second mode may also include adjusting a position of the expansion valve 52 responsive to the calculated superheat value upstream of the suction modulation valve 54. In one example, the refrigeration capacity of the refrigerant vapor compression system 2 needs to be reduced, but will result in the formation of solid phase refrigerant, as determined by methods presented hereinabove. The expansion valve 52 may be closed down to decrease the refrigerant flow, which will subsequently increase the temperature of the refrigerant exiting the refrigerant heat absorption heat exchanger 42. The resulting increase in the superheat value of the refrigerant may be sensed by the evaporator outlet temperature sensor 82 and further adjustments to the position of the expansion valve 52 may be made responsive to the temperature.

In another example, the position of the expansion valve 52 may be responsive to a sensing bulb (not shown) that monitors temperature and pressure conditions downstream of the suction modulation valve 54, such as the suction port 44 of the compressor 12. The position of the expansion valve 52 may be adjusted to prevent the pressure downstream of the suction modulation valve 54 from dropping below the triple point pressure if the temperature is below the triple point temperature, for example.

In another embodiment, the system 2 may include a heater 96 in the suction inlet line 56. The heater 96 may be positioned upstream or downstream of the suction modulation valve 54. A second mode of operation to prevent the formation of solid-phase refrigerant may include adjusting a setting on the heater 96 responsive to the pressure and temperature at a point in the suction inlet line 56. In this manner, the superheat value of the refrigerant is increased and the compressor 12 may operate below the triple point pressure of the refrigerant without concerns for damaging the compressor with solid-phase refrigerant.

In another example, the heat given off by the motor in the compressor 12 may be utilized to increase the superheat value of the refrigerant to prevent formation of the solid-vapor phase of the refrigerant. The heat may be used as an off-set value, for example. In this manner, the superheat value of the refrigerant in the suction inlet line 56 may be less than 1° K as long as the heat from the compressor motor is sufficient to raise the superheat value at the suction port 44 of the compressor 12 to at least 1° K.

In another embodiment, higher-temperature refrigerant may be mixed with the refrigerant in the suction inlet line 56 prior to the suction port 44 of the compressor 12 to prevent formation of solid-phase refrigerant. Referring to FIG. 2, the unload valve 18 in the bypass line 14 may be opened to admit hot refrigerant vapor to the existing refrigerant flow. The operation of the unload valve 18 may be responsive to the compressor suction temperature sensor 78 and compressor suction pressure transducer 84, for example.

Figure 6:
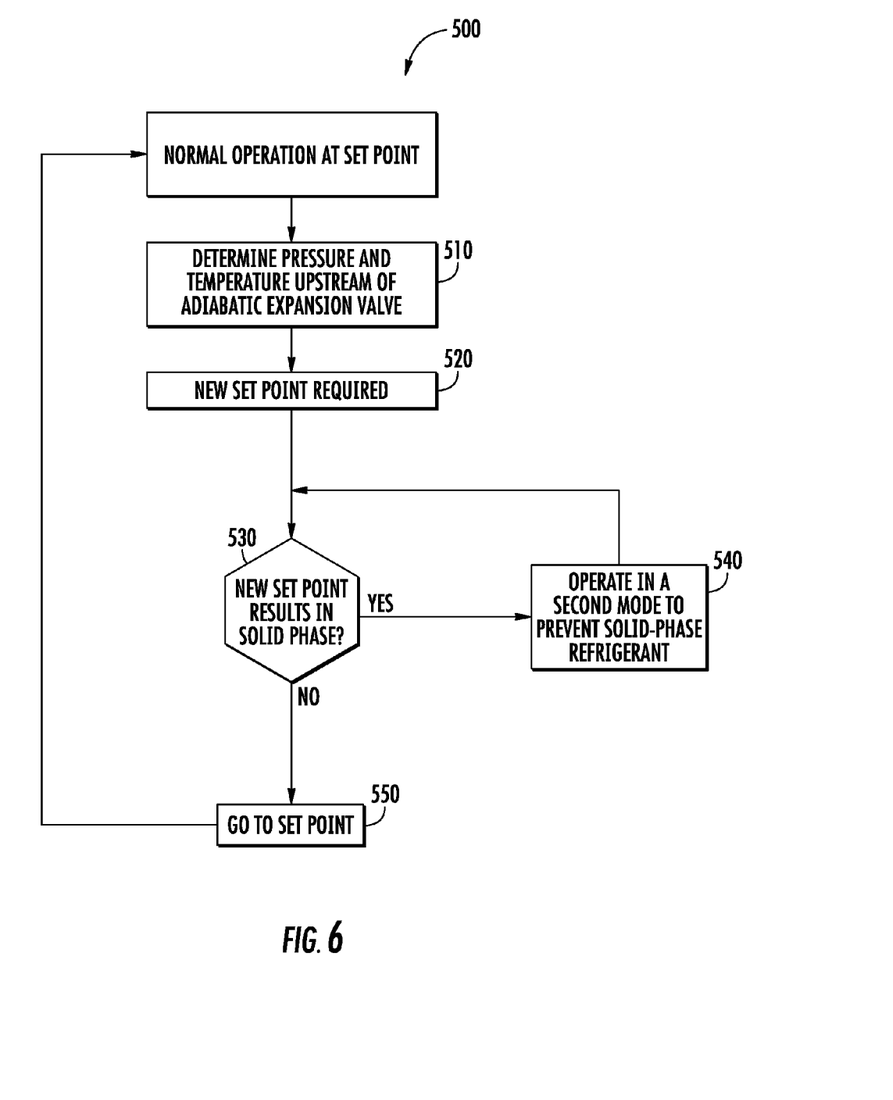
FIG. 6 is a block diagram collectively presenting a flow chart illustrating an exemplary embodiment of a method for operating a refrigerant vapor compression system according to the application.

Referring to FIGS. 2 and 6, a method 500 is disclosed for operating the refrigerant vapor compression system 2 to prevent the formation of solid-phase refrigerant. At a step 510, the pressure and temperature of the refrigerant are determined upstream of an adiabatic expansion device, such as the suction modulation valve 54. When a new set point or operating condition is required at a step 520, for example a set point that would require a change in the valve position of the valve 54, the controller 66 performs a calculation at a step 530 to determine if the new set point would result in the formation of solid-phase refrigerant. In one example, the calculation is performed using the pressure and temperature values obtained in step 510 and applying them to a lookup table containing pressure-enthalpy values such as that found in FIG. 3. The calculation would determine point J in FIGS. 3, 4, and 5, for example. The controller 66 next determines the valve setting of the adiabatic expansion device (e.g., percent open) to establish the set point. In one example, the controller 66 accesses a lookup table containing correlated values between the valve position and the resulting pressure drop value according to the particular refrigerant flow conditions. From the values in the lookup table, the controller 66 determines if the resulting pressure drop would result in solid-phase formation of the refrigerant. If so, the controller 66 enters a second mode of operation wherein the superheat value of the refrigerant is increased to prevent the solid-phase formation. The superheat value of the refrigerant may be increased by any of the methods disclosed hereinabove.

One advantage the present disclosure provides is that the refrigerant vapor compression system 2 may be operated over a greater range. For example, prior art systems may limit the capability of the expansion valve to maintain the refrigerant pressure well above the triple point pressure, assuring the subsequent expansion across the suction modulation valve will keep the refrigerant pressure above the triple point pressure. Alternately, the capability of the suction modulation valve may have been limited for the same reason. By employing the methods and apparatus disclosed herein, the expansion valve and the suction modulation valve may be operated at a greater range since the superheat value will be increased if the pressure drop would result in formation of solid-phase refrigerant.

Another advantage of the disclosed system 2 is that the compressor 12 may be operated below the triple point pressure of the refrigerant, thereby allowing a greater range of operation for the refrigerant vapor compression system 2 without risking solid-phase refrigerant damaging compressor components or blocking valves. Prior art systems have shut down the compressor if the refrigerant pressure approached the triple point pressure.

We claim:

1. A refrigerant vapor compression system comprising: a compressor for compressing a refrigerant, the compressor having a suction port and a discharge port; a refrigerant heat rejection heat exchanger operatively coupled downstream to the discharge port of the compressor; a refrigerant heat absorption heat exchanger operatively coupled downstream to the refrigerant heat rejection heat exchanger; a compressor suction inlet line connecting the refrigerant heat absorption heat exchanger to the suction port of the compressor; an adiabatic expansion device operatively coupled to the suction inlet line;

a sensor operatively coupled to the suction inlet line for measuring a superheat value of the refrigerant;

a bypass line connecting the discharge port of the compressor to the suction port of the compressor, the bypass line having an unload valve to regulate the refrigerant flow therethrough;

wherein the adiabatic expansion device is positioned upstream with respect to refrigerant flow of a point where the bypass line connects to the suction inlet line;

a controller in communication with the sensor, the controller configured to operate the refrigerant vapor compression system in a first cooling mode when a pressure of the refrigerant downstream of the adiabatic expansion device is greater than a threshold value, and operate the refrigerant vapor compression system in a second cooling mode when the pressure of the refrigerant downstream of the adiabatic expansion device is less than the threshold value, the threshold value indicative of a pressure at which expansion across the adiabatic expansion device would result in formation of solid-phase refrigerant;

wherein the second cooling mode of operation includes opening the unload valve to admit higher-temperature refrigerant to the suction port of the compressor; and wherein the compressor continues to operate in both cooling modes, wherein the refrigerant vapor compression system operates in a transcritical mode in both the first cooling mode and the second cooling mode.

2. The refrigerant vapor compression system of claim 1, wherein the adiabatic expansion device is a suction modulation valve.

3. The refrigerant vapor compression system of claim 1, wherein the second cooling mode comprises increasing the superheat value of the refrigerant in the suction inlet line.

4. The refrigerant vapor compression system of claim 1, wherein the second cooling mode comprises increasing a pressure upstream of the adiabatic expansion device until a pressure downstream of the adiabatic expansion device is above the triple point pressure of the refrigerant.

5. The refrigerant vapor compression system of claim 1, wherein the threshold value is a fixed value greater than a triple point pressure of the refrigerant.

6. The refrigerant vapor compression system of claim 5, wherein the threshold value is equal to the triple point pressure of the refrigerant.

7. The refrigerant vapor compression system of claim 1, further including an expansion valve upstream of the refrigerant heat absorption heat exchanger, wherein increasing the superheat value comprises adjusting the expansion valve.

8. The refrigerant vapor compression system of claim 7, wherein adjusting the expansion valve comprises closing down the expansion valve.

9. The refrigerant vapor compression system of claim 1, further comprising a heater disposed in thermal contact with the suction inlet line, wherein increasing the superheat value of the refrigerant comprises powering the heater.

10. The refrigerant vapor compression system of claim 1, wherein operating the refrigerant vapor compression system in the second cooling mode further comprises operating with a pressure at the suction port of the compressor being less than the triple point pressure of the refrigerant.

11. The refrigerant vapor compression system of claim 1, wherein the refrigerant is carbon dioxide.

\* \* \* \* \*